March 12, 1940.  E. C. HANSEN  2,193,131
DEMOUNTABLE RIM
Filed June 30, 1937

Edwin C. Hansen,
INVENTOR

BY Victor J. Evans & Co.
ATTORNEYS

Patented Mar. 12, 1940

2,193,131

UNITED STATES PATENT OFFICE 2,193,131

DEMOUNTABLE RIM

Edwin C. Hansen, Auburn, Ala.

Application June 30, 1937, Serial No. 151,270

1 Claim. (Cl. 301—31)

This invention relates to demountable rims for vehicle wheels, and its general object is to provide a rim that includes separable sections detachably associated in a manner to easily and expeditiously assemble and disassemble the rim with respect to a tire, without the use of tools, yet casual separation or displacement of the sections is impossible.

A further object is to provide a demountable rim that includes only two sections of substantially semi-circular formation, held associated in rim formation, by the same means used for securing the rim to the wheel or hub plate.

Another object is to provide a demountable rim of the character set forth, that is simple in construction, inexpensive to manufacture, and extremely efficient in use, operation and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
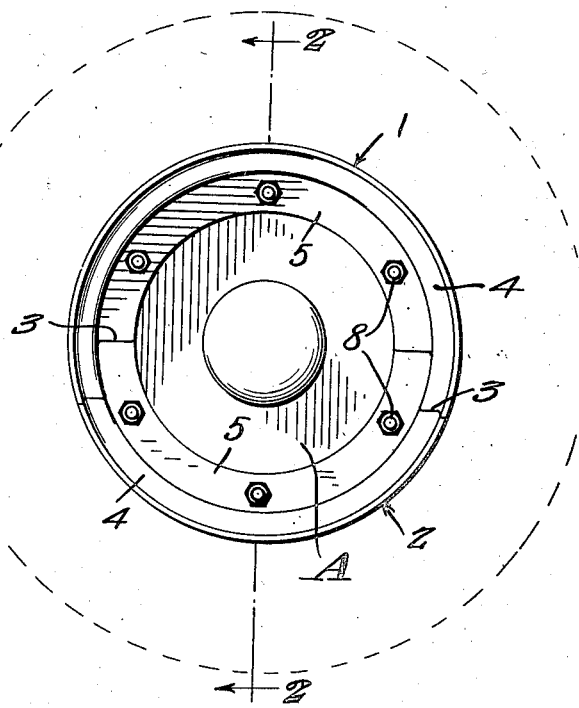
Figure 1 is a front elevation illustrating my rim in use.
Figure 2:
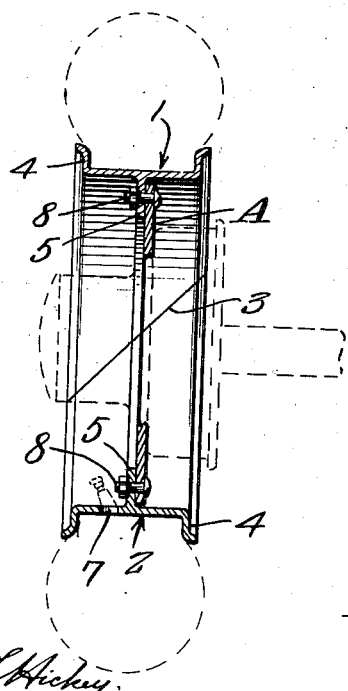
Figure 2 is a sectional view taken approximately on line 2—2 of Figure 1.

Referring to the drawing in detail, it will be noted that my rim is divided transversely upon diametrically opposite sides to provide a pair of separable substantially identical semi-circular rim sections which for distinction are indicated respectively, by the reference numerals 1 and 2, and the meeting ends of each section are inclined at an angle of approximately forty-five degrees, with respect to the axis of the rim, as at 3, to provide each section with a short side and a long side, as clearly shown in Figure 2.

Figure 3:
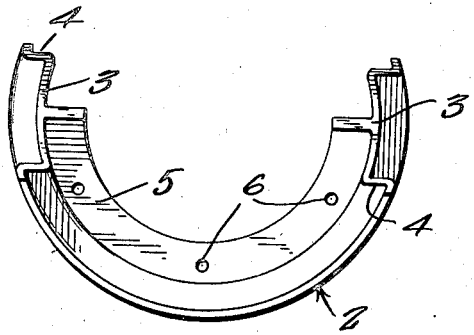
Figure 3 is a side elevation of one of the rim sections.

The sections are provided with tire receiving channel portions including bead receiving side flanges 4 having outwardly flared outer edges, as best shown in Figures 2 and 3, and formed on and extending centrally from the inner face of the channel portions are substantially semi-circular webs 5 which are co-extensive with the length of the channel portions to terminate at the ends thereof, as clearly shown in Figure 3. The webs 5 have openings 6 extending transversely therethrough, and the ends of the webs are likewise arranged at an angle of the same degree of inclination as that of the ends of the remaining portions of the sections, so that the ends of the webs, like the ends of the remaining portions will be disposed in fitting engagement, when the sections are associated in rim formation, as clearly shown in Figure 2.

The section 2 is shown as having a valve stem opening 7 therein, and in assembling my rim with respect to the tire, the section 2 is applied first, with its short side or edge directed toward the tire, thence the short side or edge of the section 1 is directed in the same manner. When the sections are arranged within the tire, as best shown in Figure 2, the rim is then applied to the wheel, which is indicated by the letter A, through the instrumentality of bolt and nut connections 8, the bolts thereof extending through the openings 6, consequently it will be seen that the rim sections are held associated by the same means used for securing the rim to the wheel.

In view of the arrangement of the meeting ends of the sections, and the manner of disposing the sections with respect to the tire, it will be obvious that the sections can be readily assembled and disassembled in an easy and expeditious manner, without the use of tire irons, tools and the like and without stretching or prying the tire with respect to the rim.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A demountable rim for a vehicle tire, comprising a pair of companion substantially identical semi-circular rim sections, each constituting exactly a half of the complete rim, and having their ends transversely inclined approximately at an angle of forty-five degrees from one side edge of the sections to the other to provide each section with a short side and a long side and for fitting engagement of the ends of one section with those of the other, each section provided with a tire receiving channel portion including side flanges outwardly flared along their outer edges, each section including a web integral therewith and having their ends flush with the ends of the channel portions, the webs extending inwardly and centrally from the inner face of the channel portions and having openings therein, one of said sections having a valve stem opening therein, and bolt and nut connections having the bolts thereof extending through the web openings for securing the sections in rim formation to the wheel of a vehicle.

EDWIN C. HANSEN.